United States Patent
Heinz

(10) Patent No.: US 9,955,396 B1
(45) Date of Patent: Apr. 24, 2018

(54) SEAMLESS SERVICE TRANSITIONS IN A MOBILE ENVIRONMENT

(71) Applicant: Cox Communications, Inc., Atlanta, GA (US)

(72) Inventor: Eric Sean Heinz, Peachtree Corners, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

(21) Appl. No.: 15/416,573

(22) Filed: Jan. 26, 2017

(51) Int. Cl.
| | |
|---|---|
| *H04W 36/00* | (2009.01) |
| *H04W 36/18* | (2009.01) |
| *H04W 36/32* | (2009.01) |
| *H04L 29/08* | (2006.01) |
| *H04L 12/26* | (2006.01) |

(Continued)

(52) U.S. Cl.
CPC ........ *H04W 36/18* (2013.01); *H04B 17/318* (2015.01); *H04B 17/336* (2015.01); *H04L 41/0893* (2013.01); *H04L 43/0894* (2013.01); *H04L 67/12* (2013.01); *H04L 67/22* (2013.01); *H04W 36/32* (2013.01); *H04W 84/12* (2013.01)

(58) Field of Classification Search
CPC ... H04W 84/005; H04W 36/32; H04W 84/18; H04W 12/08; H04W 48/04; H04W 4/046; H04W 64/00; H04W 48/18; H04W 48/16; H04W 8/183; H04W 76/02; H04W 84/12; H04W 88/06; H04W 8/005; H04W 16/00; H04W 36/0022; H04W 36/14; H04W 36/18; H04W 36/28; H04W 48/20; H04L 67/12; H04L 67/10; H04L 63/08

USPC ... 455/41.2, 456.1, 3.01, 41.1, 456.2, 456.3, 455/456.6, 435.2, 552.1, 441, 414.1, 418, 455/566; 370/259

See application file for complete search history.

(56) References Cited

U.S. PATENT DOCUMENTS

| | | |
|---|---|---|
| 8,451,752 B2 | 5/2013 | Lu |
| 8,457,546 B2 | 6/2013 | Mahajan et al. |

(Continued)

FOREIGN PATENT DOCUMENTS

CN 204259105 U 4/2015

OTHER PUBLICATIONS

"Radio-over-fiber-based solution to provide broadband internet access to train passengers [Topics in Optical Communications]", retrieved at <<https://www.researchgate.net/publication/3199845>>, Article in IEEE Communications Magazine, Mar. 2007, 9 pages.

(Continued)

*Primary Examiner* — Fred Casca
(74) *Attorney, Agent, or Firm* — Merchant & Gould

(57) ABSTRACT

Aspects of the present disclosure provide for systems and methods to enable mobile devices to connect to the Internet while in a moving vehicle that includes one or more internal cabin access points (CAPs) and one or more external vehicle access point (VAPs), but are not so limited. A disclosed system operates to enable passengers to use one or more mobile devices, such as laptops, tablets, smartphones, etc. to connect to the Internet via access points (APs) positioned along the path of travel of a moving vehicle. A disclosed method operates to seamlessly maintain network connectivity for wireless device users of a vehicle network moving from one service station AP to another service station AP along a path of travel of a moving vehicle.

20 Claims, 7 Drawing Sheets

(51) Int. Cl.
*H04B 17/318* (2015.01)
*H04B 17/336* (2015.01)
*H04L 12/24* (2006.01)
*H04W 84/12* (2009.01)

(56) References Cited

U.S. PATENT DOCUMENTS

| | | |
|---|---|---|
| 9,258,759 B2 | 2/2016 | Jia et al. |
| 2008/0037493 A1 | 2/2008 | Morton |
| 2014/0254378 A1* | 9/2014 | Jia ................. H04L 45/22 370/235 |
| 2014/0334368 A1* | 11/2014 | Zhou ................ H04W 4/08 370/311 |
| 2015/0181502 A1 | 6/2015 | Hans et al. |
| 2015/0264614 A1 | 9/2015 | Stager et al. |
| 2016/0366049 A1* | 12/2016 | Achouri ............. H04L 45/24 |
| 2017/0052774 A1* | 2/2017 | Ankapura ............. G06F 8/61 |
| 2017/0078052 A1* | 3/2017 | Matsuo ............. H04L 1/1867 |

OTHER PUBLICATIONS

Umberto, Malesci, "Wi-Fi on board for trains", retrieved in 2016 at <<https://www.fluidmesh.com/wi-fi_on_trains_future/>>3 pages.

* cited by examiner

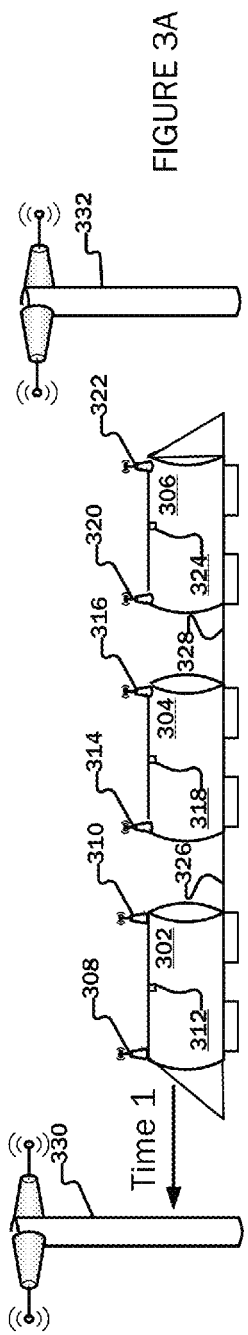
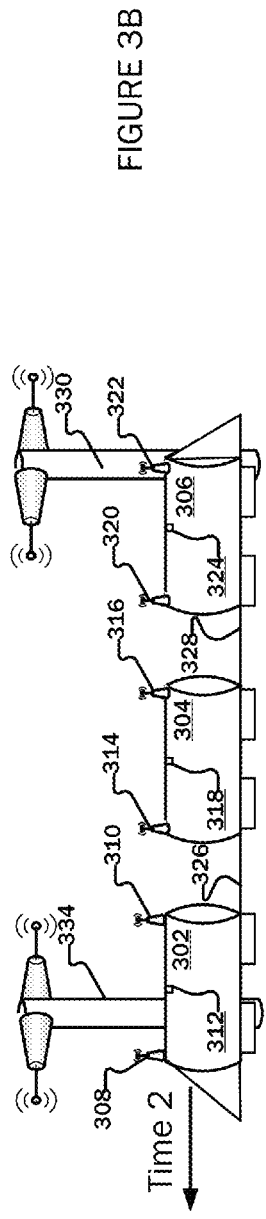
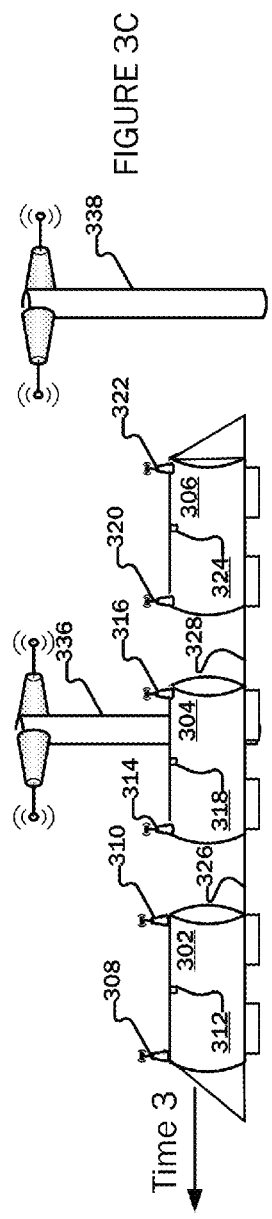

SEAMLESS SERVICE TRANSITIONS IN A MOBILE ENVIRONMENT

BACKGROUND

Wireless fidelity (WIFI) continues to evolve, allowing mobile device users to surf the Internet from vehicles such as automobiles, trucks, boats, airplanes, and trains. Many users today carry multiple devices having wireless capabilities, such as smartphones, tablet computers, and laptop computers. Each wireless connection in a wireless local area network (WLAN) consumes bandwidth and network resources. Simultaneous use of multiple devices increases the number of device connections and requires additional WLAN bandwidth. Due in part to existing communication architecture, mobile devices typically rely on a cellular network and/or a satellite network to backhaul communications from the WLAN to a back office location. Satellite systems are constrained by limited bandwidth and long round trip times, while cellular systems experience congestion, fading, co-channel interference, and unacceptable handovers.

SUMMARY

Aspects of the present disclosure provide for systems and methods to enable mobile devices to connect to the Internet while in a moving vehicle that includes one or more internal cabin access points (CAPs) and/or one or more external vehicle access points (VAPs), but are not so limited. A system of an embodiment operates to enable passengers to use one or more mobile devices, such as laptops, tablets, smartphones, etc. to connect to the Internet via access points (APs) positioned along the path of travel of a moving vehicle. A method of an embodiment operates to seamlessly maintain network connectivity for wireless device users of a vehicle network moving from one service station AP to another service station AP along a path of travel of a moving vehicle.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views:

FIGS. 3A-3C are block diagrams that depict an exemplary vehicle network, according to an embodiment;

DETAILED DESCRIPTION

Figure 1:
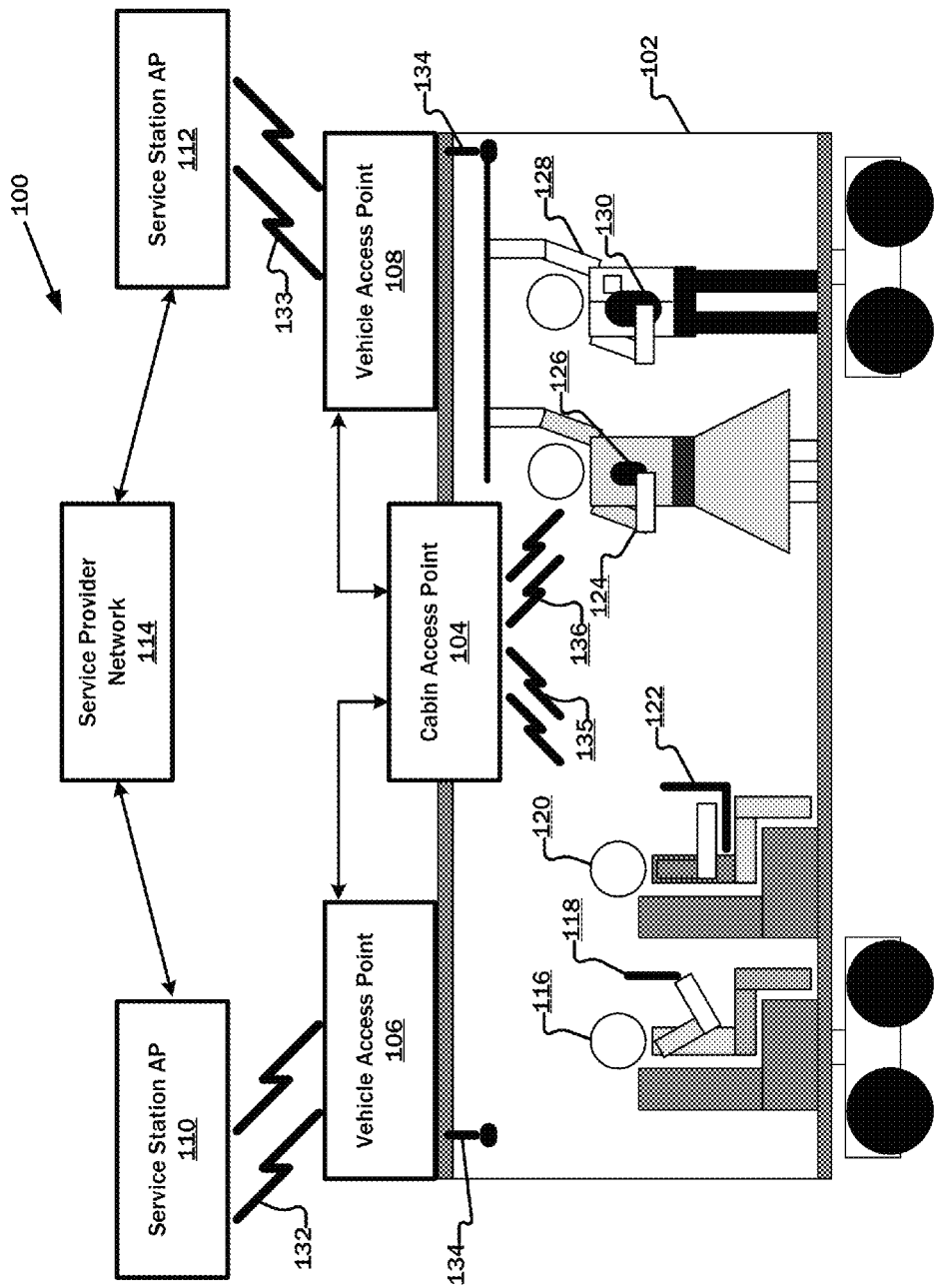
FIG. 1 is a block diagram of a system that enables users to access the Internet as passengers of a vehicle, according to an embodiment.

FIG. 1 is a block diagram of a system 100 that enables users to access the Internet as passengers of a vehicle 102, according to an embodiment. While a train car is depicted as a vehicle 102 of system 100, it will be appreciated that aspects of the present disclosure may be applied to other moving vehicles that convey multiple passengers. As shown in FIG. 1, the vehicle 102 includes an internal or cabin access point (CAP) 104, a first external vehicle access point (VAP) 106, and/or a second external VAP 108. It will be appreciated that the CAP 104 and/or first external VAP 106, and/or second external VAP 108 may be combined as a single integrated system and attached to the vehicle 102. According to a desired implementation, the vehicle 102 may include a single external VAP or more than the two external VAPs illustrated in the high level example of FIG. 1. In one implementation, each vehicle 102, such as a train car, bus, ship, etc. can be equipped with an interior CAP 104, a first external VAP 106, and/or a second external VAP 108. In an alternative embodiment, first external VAP 106 and/or second external VAP 108 can be configured to include the functionality of CAP 104 and outfitted with multiple input multiple output (MIMO) antennas focused towards service stations APs (Access Points) deployed along a path of travel and one or more antennas focused on the cabin interior.

At a high level, the hardware of each AP is configured to provide radio frequency (RF) processing, baseband processing, packet processing, etc. (e.g., signal modulation/demodulation operations, IEEE 802.11 processing operations, packet processing operations to enable QoS (Quality of Service), firewalls, bandwidth limiting, etc.) As shown in FIG. 1, there are two levels of access: interior CAPs to external VAPs and external VAPs to service station APs. Each AP can include a radio module to perform acknowledgments (ACKs), Request to Send/Clear to Send (RTS/CTS), etc. and can be used for media access control (MAC) and Layer two (L2) packet processing operations.

The system 100 includes multiple service station APs physically deployed along a path of travel including a first service station AP 110 and a second service station AP 112 communicatively coupled to a service provider network 114. For a train implementation, service station APs are positioned trackside at appropriate intervals to ensure reliable communication to at least one of the external VAPs when traversing the trackside service station APs. The first service station AP 110 and second service station AP 112 can be mounted on existing infrastructure or otherwise positioned alongside the path of travel. It will be appreciated that a plurality of such service station APs are deployed along a distance associated with the path of travel depending on the terrain, service station AP antenna and/or power characteristics, etc. Each service station AP can operate to transmit beacon frames to announce associated capabilities, such as SSID (Service Set Identifiers), supported data rates, channel agility, modulation options, security requirements, etc.

According to one embodiment, service station APs 110, 112, external VAPs 106, 108, and CAP 104 include at least one antenna, radio transmission and/or reception capability, router or switch features, memory, at least one processor, and/or a power source. Each AP can include a radio circuit (e.g., 2.x GHz or 5.x GHz transmitter/receiver), on-board logic to process IEEE 802.11 control and management information, encryption and decryption logic, and/or capability to communicate to an authentication server or other computer to confirm an identity of a user trying to access the service provider network 114. Service station APs 110, 112 may be Ethernet-attached to an Ethernet switch or attached to a wireless switch of the vehicle network, service provider network 114, and/or other network. Likewise, the CAP 104 or another component may provide an Ethernet or other wired connection to allow for wired connections to infrastructure within the cabin. Global positioning system (GPS) functionality can be included in the CAP 104, VAP 106, VAP 108, or another vehicle component and used to determine a location of the associated CAP 104, VAP 106, VAP 108, etc. in order to determine a best service station AP to associate with, since the locations of the service station APs are typically known.

First external VAP 106 and second external VAP 108 can be coupled wirelessly or via wireline to convey messages there between. Additional vehicles can be outfitted with one or more external VAPs and coupled to vehicle 102 to provide additional nodes for communicating voice and/or data communications to CAP 104. For example, an external VAP of an adjacent or otherwise positioned train car or vehicle can be used to convey voice and application data to CAP 104 due to it having a better returned signal strength indicator (RSSI) (RSSI corresponds to power in a received radio signal) and/or signal to noise ratio (SNR) than the first external VAP 106 and second external VAP 108. The first external VAP 106 and the second external VAP 108 are configured to transmit and receive communications to and from service provider network 114 via service station APs 110, 112 and other service station APs (not shown) positioned along the path of travel. As vehicle 102 traverses the path of travel, first external VAP 106 and second external VAP 108 form wireless networks 132, 133 with each service station AP 110, 112. It will be appreciated that service station APs will be positioned along the path of travel so that one or both of the first external VAP 106 and second external VAP 108 have sufficient RSSI as the vehicle 102 traverses along the path of travel.

As shown in FIG. 1, CAP 104 forms internal wireless networks 135, 136 with devices within the vehicle 102. According to an embodiment, CAP 104 includes a wireless switching circuit with selection logic that operates to select or switch to an external VAP that provides a certain RSSI and/or SNR. The selection logic is configured to automatically direct certain wireless devices and/or users to a corresponding external VAP. For example, CAP 104 can include wireless switching hardware configured to switch a wireless device from one external VAP to another external VAP within a chain of vehicles as part of providing load balancing operations to provide greater aggregate bandwidth. A central controller connected to a group of service station APs and/or each external VAP can also include the selection logic for directing the wireless devices to a corresponding external VAP. For example, a wireless controller can notify the CAP which external VAP to associate with, including available channels of the external VAP and available channels of other external VAPs.

As shown in the high level illustration of FIG. 1, first external VAP 106 is closer in distance to first service station AP 110 as compared to second service station AP 112. Likewise, at this point in time, second external VAP 108 is closer in distance to second service station AP 112 as compared to first service station AP 110. Assuming similar power transmission and reception capabilities of the associated antennas, the RSSI for first external VAP 106 is higher for signals received from the first service station AP 110 as compared to the second service station AP 112. Likewise, at this point in time, the RSSI for second external VAP 108 is higher for signals received from the second service station AP 112 as compared to the first service station AP 110.

As vehicle 102 traverses along the path of travel from the first service station AP 110 towards the second service station AP 112, the RSSI for first external VAP 106 grows higher for signals received from the second service station AP 112 as compared to the first service station AP 110. Assuming similar SNRs, communications for the first external VAP 106 would then be transitioned from the first service station AP 110 to the second service station AP 112. Likewise, communications for the second external VAP 108 would then be transitioned from the second service station AP 112 to a next service station AP (not shown) along the path of travel as the next service station AP's SNR or RSSI gains in strength over the second station AP 112 and as the bandwidth requirements dictate. The CAP 104 continues to receive and transmit communications and is unaffected by these transitions as long as one or both of first external VAP 106 and second external VAP 108 are communicatively coupled to a corresponding service station AP.

Depending on the antenna configuration of the service station APs, it is possible that both the first external VAP 106 and second external VAP 108 may share a single service station AP. If multiple vehicles (e.g., train cars, buses, ships, etc.) are linked together, a next or previous vehicle in the chain may have an external VAP that provides a better RSSI than either of the first external VAP 106 or second external VAP 108 of vehicle 102. In such a situation, the first external VAP 106 or second external VAP 108 may be used as a repeater device to convey the signal from an adjacent vehicle (and likewise down the chain).

System 100 operates to provide passengers of vehicle 102 (or an adjacent or otherwise coupled vehicle) a seamless network experience when using CAPs 104 to access and use features of the Internet. As described below, the system 100 can operate to provide dynamic load balancing of passenger devices. For example, the system 100 can operate to steer certain types of devices, users, and/or types of traffic to either external VAP of vehicle 102 or some other coupled vehicle. RSSI, SNR, and/or one or more other parameters may be used as part of selection logic when directing a wireless device and/or a user to a corresponding external VAP.

The system 100 of an embodiment can use an array of antennas and associated transcribing equipment employed as service station APs positioned along the path of travel, wherein the array of antennas are coupled via fiber or coaxial cable to one or more remote control stations (e.g., base stations) that perform one or more of demodulation operations, modulation operations, synchronization operations, multiplexing operations, spread spectrum operations, error control operations, and the like. Alternatively, each AP can operate to perform all or some portion of the remote controller operations. As an example, depending on the type of antenna (directional or omnidirectional) service station APs 110, 112 may be positioned at varying distances depending upon the path of travel (e.g., 25 m, 50 m, 100 m, 200 m, 1 km, etc.). A combination of directional and omnidirectional antenna types may be utilized since some travel portions may be substantially linear whereas other travel portions may be substantially non-linear. It will be appreciated that antenna design and power characteristics of each antenna can be configured according to the path of travel and physical deployment locations.

With continuing reference to FIG. 1, passenger 116 is using device 118 (a tablet computer for this example), passenger 120 is using device 122 (a laptop computer for this example), passenger 124 is using device 126 (a smartphone for this example), and passenger 128 is using device 130 (a smartphone for this example). Depending on a capacity configuration of vehicle 102, up to one hundred or more passengers may be riding and/or attempting to access the Internet with one or more personal devices. According to an embodiment, first external VAP 106 can be configured to use a first wireless channel (e.g., channel 1) and second external VAP 108 can be configured to use a second wireless channel (e.g., channel 6 or 11) to establish an internal connection with the CAP 104, which then uses a third wireless channel to establish connections to devices 118, 122, 126, 130. Each wireless device includes wireless network interface circuitry that enables a corresponding device to access the CAP 104 and ultimately service provider network 114.

As described below, the system 100 includes logic to dynamically allocate bandwidth to devices 118, 122, 126, 130 as part of load balancing operations. According to an embodiment, the system 100 operates to switch or route traffic to either the first external VAP 106 or to the second external VAP 108 or vice versa as the vehicle 102 moves within range of one service station AP and out of range of another. Depending on the type of antenna and power considerations, as vehicle 102 moves away from first service station AP 110 and towards second service station AP 112, first external VAP 106 may experience a higher RSSI and/or higher SNR with respect to first service station AP 110 as compared to second service station AP 112.

The system 100 is configured to dynamically allocate wireless device connections to the first external VAP 106 and/or the second external VAP 108 (or another external VAP) depending in part on an amount of available bandwidth and/or a device type in use, application type in use, user type, etc. As described below, the number of connections and the connection parameters (e.g., speed, duty cycle, radio type, band, signal, SNR, etc.) can be used to determine the overall bandwidth available per user. The service station APs 110 and 112 may be coupled to one or more network types such as a wireless wide area network (WAN) (e.g., a Universal Mobile Telecommunications System (UMTS) network, a High Speed Packet Access (HSPA) network, a Worldwide Interoperability for Microwave Access (Wi-MAX) network, a Long Term Evolution (LTE) network, etc.). The first external VAP 106 and the second external VAP 108 are configured to access and form a wireless communicative coupling with the service station APs 110, 112 as the vehicle 102 moves along the vehicle path.

The CAP 104 of an embodiment operates as a wireless router to enable access to a network associated with vehicle (i.e., vehicle network) that can include a wired and/or wireless local area network (LAN) such as a WIFI network, an Ethernet network, a Bluetooth network, etc. For example, CAP 104 can include or use a wireless controller to communicate with compatibly configured client devices. CAP 104 and external VAPs 106, 108 can be configured to receive and forward communications (e.g., packets) addressed to a remote server of service provider network 114 via a global network formed by logical and physical couplings between WANs and/or LANs.

As described above and further below, each wireless device and AP includes at least one antenna configured to receive analog electromagnetic wave signals in a particular frequency range and a transceiver configured to convert analog electromagnetic wave signals into digital signals and vice versa. A transceiver operates to transmit analog electromagnetic wave signals in a particular frequency range and with signal power amplitudes through a respective antenna. The digital signals may represent outgoing communications received from a wireless passenger device and/or incoming communications received from a remote server or other component of service provider network 114 or some other entity. The digital signals may also represent communications exchanged with another CAP, external VAP, etc.

According to an embodiment, vehicle 102 includes camera system 134 that can be used to identify device types, application types, and/or users and/or monitor access group and other changes for use in AP allocation operations. The information obtained by camera system 134 can be used as part of the dynamic allocation process when allocating internal connections to one or more external VAPs. For example, the camera system 134 can be used to determine when a user connects multiple wireless devices or switches from one device to a different device and performs a real-time reallocation based on the change. Camera system 134 can also be used to identify a passenger as the passenger moves from one vehicle to a different vehicle and is used in internal connection allocation or reallocation operations.

In certain implementations, CAP 104, external VAPs 106, 108, and/or service station APs 110, 112 can utilize a system on a chip (SoC) architecture that includes a single chip host CPU (Central Processing Unit) module and one radio module. A dual radio AP can be implemented with the SoC architecture with two chips: a first chip that includes a host CPU (e.g., MIPS or ARM core) and one radio module (e.g., a/b/g/n), and a second chip for a second radio module (e.g., a/b/g/n or ac/b/g/n). The second chip can be fixed to a circuit board or provided on a PCI Express (PCIe) card that plugs into the PCI slot on the board that interfaces with the CPU chip. The PCIe form factor for the radio module allows for changing the radio module to more easily launch updated hardware versions of an AP. The radio modules can be implemented as dual band tunable, but are tied to one band (e.g., one tied to 2.x GHz and one tied to 5.x GHz). A dedicated CPU chip architecture form factor can include a separate host CPU chip and first and second radio chips for a dual radio AP. It will be appreciated that an IEEE 802.11 network may have many APs that connect back into a core Ethernet network through one or more L2 Ethernet switches. A single WLAN can be created when each AP transmits the same network name (SSID).

Figure 2:
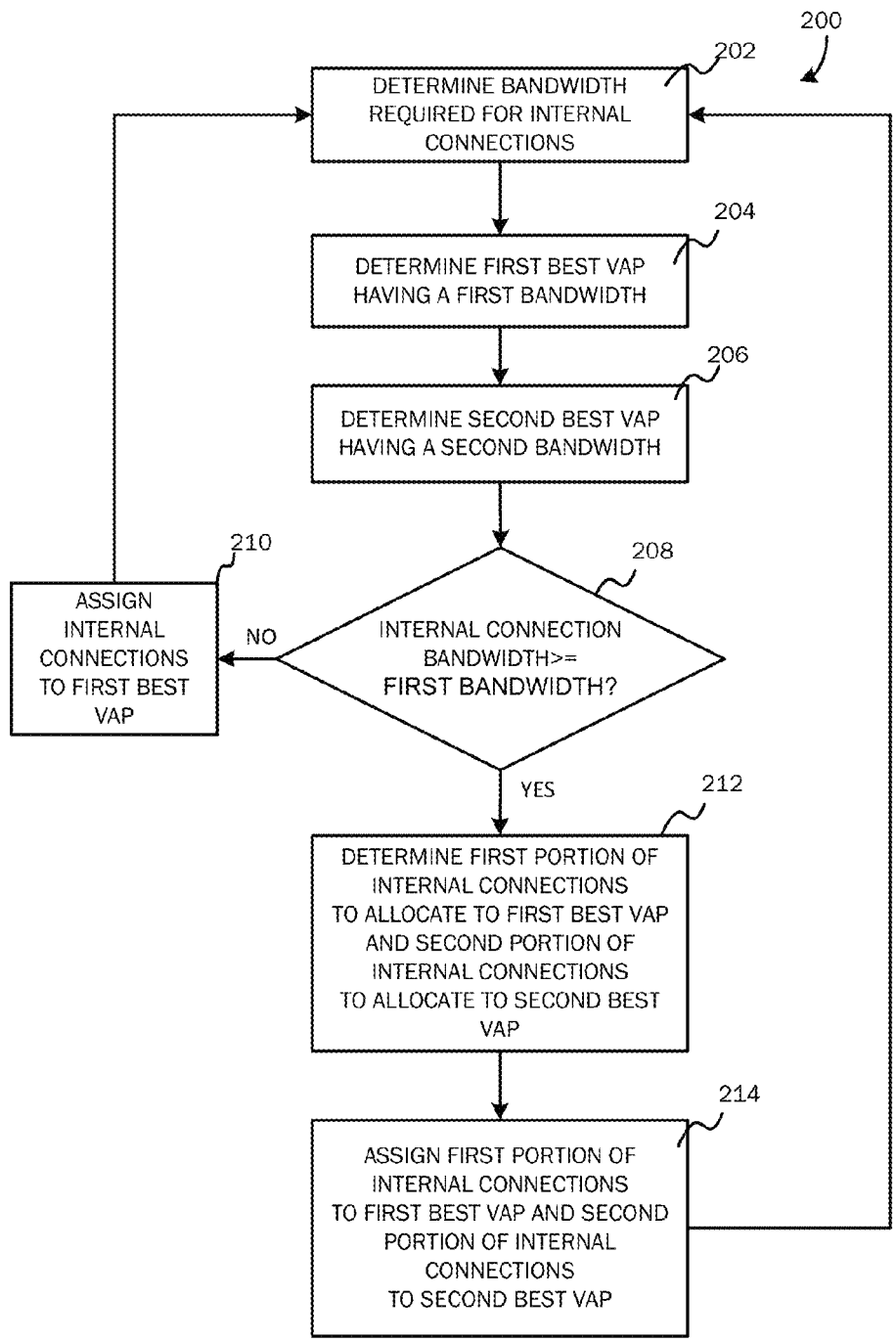
FIG. 2 is a flow diagram of a process that operates to distribute wireless bandwidth of a vehicle network among a plurality of users, according to an embodiment.

FIG. 2 is a flow diagram of a process 200 that operates to distribute wireless bandwidth of a vehicle network among a plurality of users, according to an embodiment. The process 200 is described in the context of multiple users riding in a moving vehicle, such as a train, ship, bus, or other vehicle type. For example, the process 200 can be used to dynamically allocate an amount of available AP bandwidth to a plurality of train passengers commuting along a rail line. For this example, it is assumed that multiple service station APs (e.g., service station APs 110, 112 of FIG. 1, service station APs 330, 332, 334, 336, 338 of FIGS. 3A-3C) are physically deployed along a path of travel enabling one or more external VAPs (e.g., VAPs 106, 108) coupled to the moving vehicle to connect to service station APs positioned along the path of travel. It is also assumed that each passenger is using at least one wireless device (e.g., smartphone, tablet, laptop, etc.) to access the vehicle's wireless network to access the Internet or some other network.

At 202, the process 200 starts by determining a bandwidth requirement for all internal connections associated with each wirelessly connected passenger device. In certain cases, a single user may be using multiple wireless devices and the process 200 therefore uses a number of connections rather than a number of passengers to determine the bandwidth requirement. The process 200 at 202 of an embodiment uses router software or firmware (e.g., DD-WRT product or OpenWRT product) of an interior vehicle router or AP (e.g., CAP 104) to determine an amount of bandwidth required for all internal connections. For example, a train may be carrying fifty passengers where thirty passengers are using at least one wireless device to connect to CAP 104 and surf the Internet. The process 200 at 202 determines the amount of bandwidth required to support an amount of bandwidth per connection and determines a value for all internal connections. For example, a dedicated controller can be configured to track bandwidth usage of the number of internal connections by media access control (MAC) address and/or Internet Protocol (IP) address.

At 204, the process 200 operates to determine an amount of available bandwidth associated with a first best external VAP (e.g., external VAP 106 or external VAP 108). For example, the process 200 at 204 can use network load monitoring software to determine an amount of available bandwidth associated with an external VAP having a highest RSSI corresponding to an amount of power associated with a received radio signal and/or a highest SNR. At 206, the process 200 operates to determine an amount of available bandwidth associated with a second or next best external VAP (e.g., external VAP 106 or external VAP 108).

The process 200 at 204 and 206 of an embodiment uses a controller computer machine that includes a network load monitor to determine an amount of available bandwidth associated with each external VAP. The process 200 at 204 and 206 of one embodiment utilizes network load monitors at each external VAP to determine an amount of corresponding available bandwidth. As used herein, a "best" external VAP includes a highest RSSI and/or a highest SNR as compared to other external VAPs. The controller computer machine can maintain a list of external VAPs arranged by an amount of available bandwidth from a highest RSSI and/or a highest SNR to a lowest RSSI and/or a lowest SNR (see FIG. 4). For example, a train may include multiple passenger vehicles each equipped with one or more external VAPs, wherein each external VAP can be monitored for an amount of available bandwidth in real or near real time.

If the bandwidth associated with the internal connections is less than the amount of available bandwidth of the first best external VAP at 208, the process 200 at 210 operates to assign the internal connections to the first best external VAP to enable wireless communications with the vehicle network for the vehicle passengers before returning to 202. If the bandwidth associated with the internal connections is greater than or equal to the amount of available bandwidth of the first best external VAP at 208, the process 200 at 212 uses selection or allocation logic to determine a first portion or amount of the internal connections to assign or allocate to the first best external VAP and a second portion or amount of the internal connections to assign or allocate to the second best external VAP. For example, the selection logic of process 200 at 212 can determine how to allocate the internal connections to each external VAP based on an amount of bandwidth consumed or a predicted consumption value for each of the internal connections in conjunction with the amount of bandwidth available at each external VAP. Depending on the configuration of vehicle network, additional external VAPs from adjacent and otherwise disposed vehicles can be used for internal connection allocation determinations and/or assignments.

At 214, the process 200 operates to assign the first portion of the internal connections to the first best external VAP and the second portion of the internal connections to the second best external VAP as determined at 212. For example, the process 200 at 214 can allocate a larger number of internal connections to the second best external VAP when the second best external VAP has more available bandwidth than the first best external VAP. Likewise, the process 200 at 214 can allocate a larger number of internal connections to the first best external VAP when the first best external VAP has more available bandwidth than the second best external VAP. Similarly sized groups of internal connections can be assigned to each of the first best external VAP and the second best external VAP when the amount of available bandwidth of each is approximately the same. It is possible that only one external VAP provides a viable communication link, in which case all internal connections can be routed through the single VAP.

The process 200 can take into consideration application types, user types, and/or device types when allocating the internal connections to one external VAP as compared to another. For example, smartphones may be prioritized for assignment to a second best external VAP as compared to tablets and laptops due in part to a lower amount of bandwidth consumed by the smartphone. Video, file sharing, and/or other applications that consume larger amounts of bandwidth may be allocated to the external VAP having a greater amount of available bandwidth as compared to other external VAPs. Users may be grouped into allocation groups and pushed to one external VAP versus another. For example, a user logged on as a guest may be assigned to an external VAP having a lower amount of available bandwidth and/or RSSI as compared to other available external VAPs. Conversely, a user logged in as a vehicle network member may be assigned to an external VAP having a higher amount of available bandwidth and/or RSSI as compared to other available external VAPs.

Once logged in to the vehicle network, a user is able to move freely from vehicle to vehicle without having to re-authenticate due in part to the chain of communicatively coupled external VAPs of the vehicle network. As described above, one or more video camera systems can be used to identify device types and/or application types in use as well as identifying particular users for use in dynamic allocation operations. For example, video camera system 134 can be used to identify when a user switches from one type of device to a different device and the process 200 can use the feedback to preemptively or in real time allocate the different device to an external VAP based on the type of the different device in use. As another example, video camera system 134 can be used to identify when a user switches from one type of application (e.g., video streaming) to a different type of application (e.g., email) and the process 200 can use the feedback to preemptively or in real time allocate the device to an external VAP based on the type of the application in use. As described below, each CAP (e.g., CAP 104) may be communicatively coupled (wired and/or wireless) to external VAPs of other vehicles that form a vehicle network. The process 200 returns to 202 and continues monitoring for changes in an amount of bandwidth required for the internal connections.

FIGS. 3A-3C are block diagrams that depict an exemplary vehicle network 300 that includes three vehicles: vehicle 302, vehicle 304, and vehicle 306, according to an embodiment. It will be appreciated that the vehicle network 300 can include fewer or greater numbers of vehicles, internal CAPs, and/or external VAPs. As described above, service station APs included as part of vehicle network 300 can be physically located along the path of travel, whether mounted on the tracks, on poles distributed along the tracks, or otherwise disposed. For ease of illustration, two service station APs are shown in each of FIGS. 3A-3C. As an example, to provide a good wireless experience to passengers to support voice, video, and/or data while moving in a path of travel between service station APs, a communication link should be maintained between the VAPs and at least one service station AP at all times.

As shown in FIG. 3A, vehicle 302 includes a first external VAP 308, a second external VAP 310, and an internal CAP 312. Vehicle 304 includes a first external VAP 314, a second external VAP 316, and an internal CAP 318. Vehicle 306 includes a first external VAP 320, a second external VAP 322, and an internal CAP 324. Each internal CAP is configured to couple to the external VAPs and support a number of connections per passenger of each vehicle 302-306. For example, each vehicle 302-306 may have a capacity of fifty to one hundred passengers, wherein each internal CAP is configured to support at least two connections per passenger. Each external VAP can be configured to operate on a separate channel to reduce interference and cross-talk between external VAPs. Likewise the internal CAP could also be configured to operate on a separate channel for the system to avoid self-induced interference. Each internal CAP, external VAP, or another component can include selection logic circuitry configured to allocate internal connections for the vehicle network 300.

According to an embodiment, each internal CAP, external VAP, or a dedicated controller computer can use a dynamically generated VAP allocation list and the selection logic circuitry to control allocation of internal connections for each vehicle of the vehicle network 300. For this example, the first external VAP 308, second external VAP 310, internal CAP 312, first external VAP 314, second external VAP 316, internal CAP 318, first external VAP 320, second external VAP 322, and/or internal CAP 324 are communicatively coupled to one another via wireless and/or wired links. For example, couplings 326 and 328 can be used as conduits for wired connections to provide communicative couplings between components of vehicles 302, 304, and 306. Depending on the size of the vehicle network 300, one or more external VAPs can be used to support a repeater function. A repeating external VAP associates with at least one other external VAP to extend the radio coverage range (e.g., 2.4 GHz radio or 5 GHz radio configured as a repeater and the other as a radio AP). Each vehicle can include additional equipment such as dedicated controller computers, wired and/or wireless switches, antennas, and/or other components.

With continuing reference to FIG. 3A, vehicle network 300 uses service station AP 330 and service station AP 332 to provide Internet access to passengers as well as backhaul links to a service provider or other system. As described further below and above, service station APs can be strategically located along the path of travel allowing external VAPs of the vehicle network 300 to form a communicative coupling as the vehicle network 300 traverses the path of travel. Once a passenger has logged in to the vehicle network 300 via any one of internal CAP 312, internal CAP 318, and internal CAP 324, the passenger is free to move from vehicle to vehicle without having to re-authenticate into the vehicle network 300. Moreover, transitions between external VAPs and service station APs go unnoticed by the passengers since the vehicle network 300 remains connected as long as a service station AP is online and in proximity to at least one external VAP.

For this example, RSSI and/or SNR are used by a controller (not shown) to generate a dynamic list of external VAPs from a best external connection to a worst external connection. The controller may be connected to a plurality of service station APs, external VAPs, and/or internal CAPs according to the distances involved and/or any hardware constraints associated with the communication architecture. In one embodiment, the list includes an RSSI value, an SNR value, and/or an available bandwidth value for each external VAP of the vehicle network 300. Internal CAP 312, internal CAP 318, and internal CAP 324 and/or a dedicated controller or switch can use the list of external VAPs to allocate corresponding internal connections. As shown in FIG. 3A, at time 1 and due to the physical relationship between vehicle network 300 and service station AP 330 and service station AP 332 (for omnidirectional or bidirectional antenna systems), from best external connection to worst external connection, the allocation list includes: external VAP 308, external VAP 322, external VAP 310, external VAP 320, external VAP 314, and external VAP 316.

Assume for this example, that vehicle 302 is for first class passengers (e.g., priority 1 type access), vehicle 304 is for business class passengers (e.g., priority 2 type access), and vehicle 306 is for coach passengers (e.g., priority 3 type access). Internal connections associated with priority 1 type access are allocated to at least one of external VAP 308 and/or external VAP 322 (first and second best external connections). Even though external VAP 322 is physically coupled to vehicle 306, the first class passengers of vehicle 302 are given priority over the coach passengers of vehicle 306 due to the priority status for this example. Internal connections associated with priority 2 type access are allocated to at least one of external VAP 310 and/or external VAP 320 (third and fourth best external connections). Internal connections associated with priority 3 type access are allocated to at least one of external VAP 314 and/or external VAP 316 (fifth and sixth best external connections). It will be appreciated that the list can include any number of external VAPs depending upon the configuration of the vehicle network 300. Moreover, while two external VAPs are included for each vehicle of this example, greater or fewer numbers of external VAPs may be utilized according to a desired implementation.

FIG. 3B depicts the vehicle network 300 at time 2 (moving from right to left) and due to the physical relationship between vehicle network 300 and service station AP 330 and service station AP 334, from best external connection to worst external connection, the allocation list includes: external VAP 322, external VAP 308, external VAP 310, external VAP 320, external VAP 314, and external VAP 316. Due to the list change, a transition or reallocation of internal connections occurs at or about time 2, such that: internal connections associated with priority 1 type access are dynamically allocated to at least one of external VAP 322 and/or external VAP 308 (first and second best external connections); internal connections associated with priority 2 type access are allocated to at least one of external VAP 310 and/or external VAP 320 (third and fourth best external connections); and internal connections associated with priority 3 type access are allocated to at least one of external VAP 314 and/or external VAP 316 (fifth and sixth best external connections).

FIG. 3C depicts the vehicle network 300 at time 3 (moving from right to left) and due to the physical relationship between vehicle network 300 and service station AP 336 and service station AP 338, from best external connection to worst external connection, the allocation list includes: external VAP 316, external VAP 314, external VAP 310, external VAP 322, external VAP 320, and external VAP 308. Due to the list change, a transition of internal connections occurs at or about time 3, such that: internal connections associated with priority 1 type access are dynamically allocated to at least one of external VAP 316 and/or external VAP 314 (first and second best external connections); internal connections associated with priority 2 type access are allocated to at least one of external VAP 310 and/or external VAP 322 (third and fourth best external connections); and internal connections associated with priority 3 type access are allocated to at least one of external VAP 320 and/or external VAP 308 (fifth and sixth best external connections). Similar internal connection transitions occur as the vehicle network 300 traverses along the path of travel and interacts with additional service station APs (e.g., trackside or otherwise located APs). First class, business class, coach class, and/or other passenger types may be distributed and/or mingled differently and FIGS. 3A-C are merely one example implementation. As described above, a camera system can be included in each vehicle and used for real time determinations of device type, application type, and/or user type when performing load balancing and/or other operations.

It will be appreciated that the internal connection allocations are dependent on an amount of bandwidth required for the internal connections and/or an amount of available bandwidth of each external VAP in the list. As described above, device type, application type, and/or user type can be used as allocation parameters when determining how to allocate one or more internal connections to particular external VAPs of an allocation list. For example, smartphones and other low bandwidth consuming applications may be automatically allocated to external VAPs having lower operational characteristics due to the reduced load associated therewith. Before allocation, an amount of available bandwidth of a corresponding external VAP is compared to an amount of bandwidth required for the internal connections to be allocated.

When an amount of available bandwidth is limited, priority rules based on device type, application type, user type, and/or other parameters can be used when allocating one connection over another connection. Priority may also be given to internal connections for external VAPs of the same vehicle. For example, internal connections associated with vehicle 302 may be given priority of using external VAP 308 and external VAP 310 for such an implementation. Variables such as transceiver sensitivities, antenna configurations, power constraints, attenuation effects, and/or reflection effects may affect RSSI and/or SNR values and are taken into account when allocating the internal connections.

Figure 4:
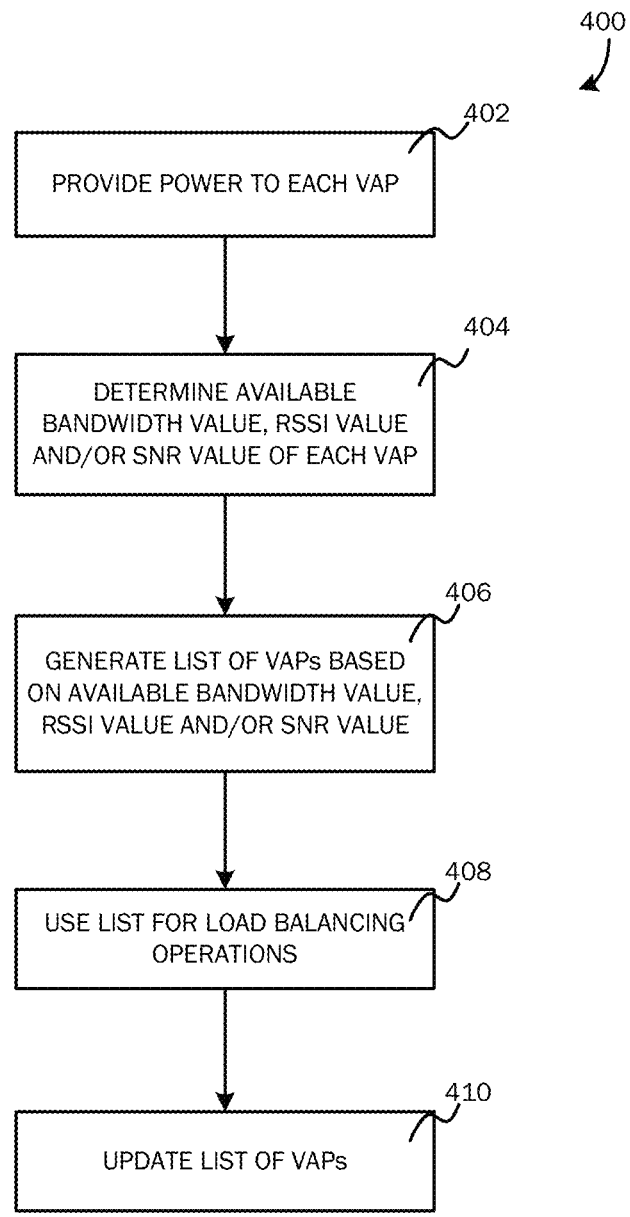
FIG. 4 is a flow diagram of a process of providing an allocation list of external VAPs associated with a vehicle network for use in internal connection load balancing operations, according to an embodiment.

FIG. 4 is a flow diagram of a process 400 of providing an allocation list of external VAPs associated with a vehicle network (e.g., vehicle network 300) for use in internal connection load balancing operations, according to an embodiment. At 402, the process 400 begins when power is provided to each external VAP and/or internal CAP of each vehicle associated with the vehicle network. At 404, the process 400 operates to determine an amount of available bandwidth value, an RSSI value, and/or an SNR value associated with each external VAP and/or internal CAP of the vehicle network. At 406, the process 400 operates to generate a list of external VAPs by one or more of the available bandwidth value, the RSSI value, and/or the SNR value. At 408, the process 400 operates to use the list for load balancing operations. For example, the list can be used to allocate internal connections between external VAPs as described above with respect to FIGS. 3A-3C.

In one embodiment, the list of external VAPs is generated from a best external VAP to a worst external AP based on one or more of the available bandwidth value, RSSI value, and/or SNR value. For example, a best external VAP may be associated with the largest available bandwidth value, the highest RSSI value, and/or the highest SNR value. As another example, the best external VAP may be associated with the largest available bandwidth value. As yet another example, the best external VAP may be associated with the highest RSSI value and the highest SNR value. Likewise, as further example, a worst external VAP may be associated with the smallest available bandwidth value, the lowest RSSI value, and/or the lowest SNR value. As another example, the worst external VAP may be associated with the smallest available bandwidth value. As yet another example, the worst external VAP may be associated with the lowest RSSI value and the lowest SNR value. It will be appreciated that other communication parameters may be used to generate the list of external VAPs. At 410, the process 400 operates to update the list of external VAPs. For example, a vehicle speed, external VAP to service station AP distance, etc. can be used as a measure to determine when to update the list. Similarly, predefined lists of service station APs could also be maintained by the system to which the VAPs would associate. As an example, a vehicle moving along a fixed route could use a predefined list (and order) of service station APs to use, as those would be repeated each time the vehicle moved along the same fixed route.

Figure 5:
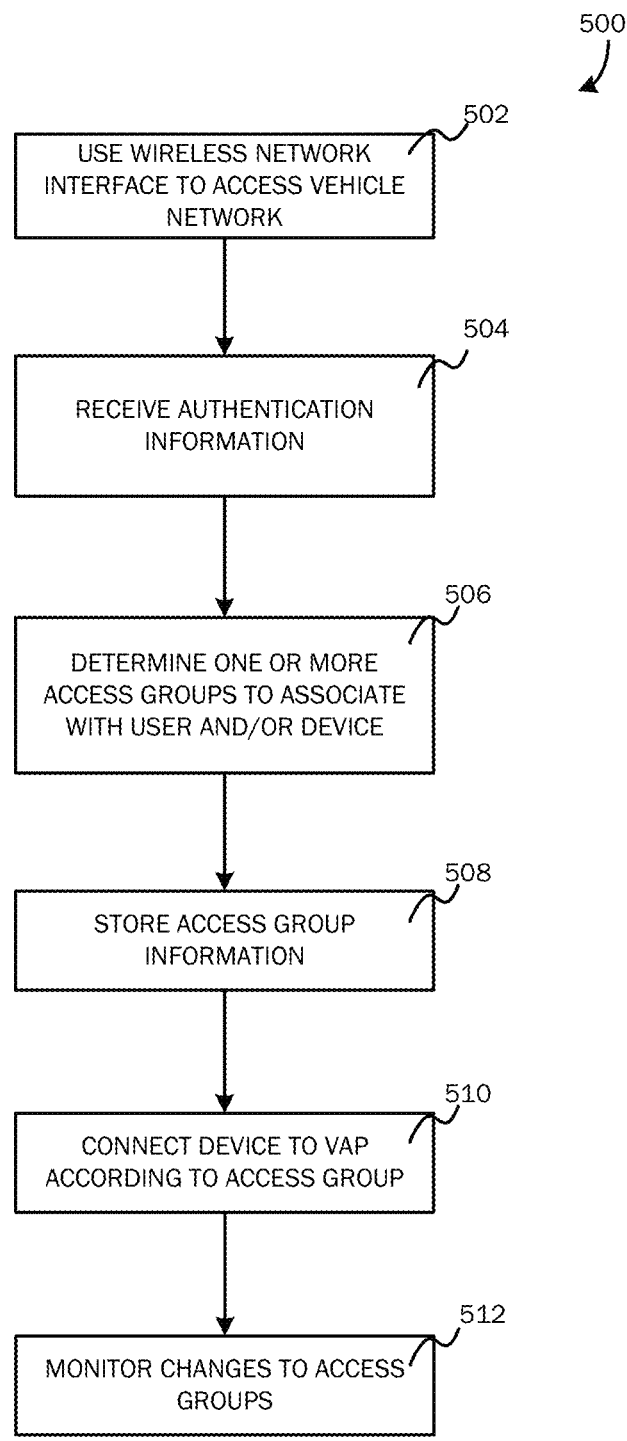
FIG. 5 is a flow diagram of a process that operates to use an internal CAP of a vehicle network to connect to one or more external VAPs of the vehicle network, according to an embodiment.

FIG. 5 is a flow diagram of a process 500 that operates to use an internal CAP of a vehicle network to connect to one or more external VAPs of the vehicle network, according to an embodiment. As described above, once connected and online, a passenger is able to use the Internet and/or other services provided by a service provider or other entity while connected to the vehicle network. At 502, the process 500 begins when a user uses a device having a wireless network interface to access the vehicle network. For example, upon being seated in a passenger train, a user intends to use a smartphone to stream video of a recent event. According to an embodiment, in order to use the vehicle network to stream the video, the user has to use a particular application (e.g., a service provider mobile app) associated with the vehicle network to authenticate before accessing the vehicle network.

At 504, the process 500 receives authentication information associated with the user. As described above, each internal CAP is communicatively coupled (e.g., wired and/or wireless couplings) to one or more external VAPs, including external VAPs of different vehicles of the vehicle network (see FIGS. 3A-C for example). In certain embodiments, the one or more vehicles of the vehicle network can include one or more dedicated computers to authenticate and store authentication information associated with each authenticating user. In such a configuration, authentication operations can be performed locally at the vehicle network without having to use backhaul channels to a service provider for performing authentication operations.

At 506, the process 500 determines, based in part on the authentication information, one or more access groups to associate with the authenticating user and/or device. For example, a user may have signed on as a guest user and the process 500 at 506 associates the guest user with a lower tier access group that accesses the Internet or service provider network using one or more lower fidelity external VAPs. As another example, a user may have signed on as a member user having first class credentials, and the process 500 at 506 associates the first class member user with a highest tier access group that accesses the Internet using one or more of the best fidelity external VAPs. It will be appreciated that different allocation rules can be defined for each type of authenticating user, authenticating device, etc. As described above, an integrated camera system can be used to identify user types, device types, etc. for use in real-time allocation and reallocation operations including associating devices and/or users to particular access groups.

At 508, the process 500 operates to store the access group information in a computer readable storage device or medium, such as a database coupled to a dedicated local authenticating and/or AP allocation computer. At 510, the process 500 operates to connect the wireless device to an appropriate external VAP according to the corresponding access group. At 512, the process 500 operates to monitor changes to access groups as the vehicle network traverses along a path of travel. For example, as users exit a vehicle at a stop, the process 500 at 512 can modify a corresponding access group associated with the exiting users and/or reallocate one or more internal connections. For example, as bandwidth is freed up due to the exiting users, new passengers and/or passengers associated with one or more access groups may be allocated to a defined group or reallocated to a defined group and connected to one or more corresponding external VAPs based on the change.

Computers, wireless devices/system, etc. used in a vehicle network include processors and memory storage devices, which store instructions that when executed by the processors enable dynamic allocation and reallocation of internal connections to external VAPs. Memory storage devices are articles of manufacture that include computer-readable storage media. The term computer-readable storage media does not include transmission media, but refers to hardware media used to store desired information for access by a computer or processor. Examples of computer-readable storage media include, but are not limited to, RAM, ROM, EPROM, EEPROM, solid state memory, such as flash memory, optical storage, such as CD-ROMs and DVDs, and magnetic storage devices, such as magnetic tape and magnetic disks.

If will be appreciated that a vehicle network can use service station infrastructure deployed along a path of travel to access a hybrid fiber coax (HFC) network, satellite network, cellular network, and/or other network types associated with a service provider or other entity. One example infrastructure deployment uses optical fiber that runs from a cable head end to deployed service station APs along the path of travel. Passengers can use the vehicle network to access a variety of services including traditional digital and analog video programming, telephone services, high speed Internet access, video-on-demand, etc.

Figure 6:
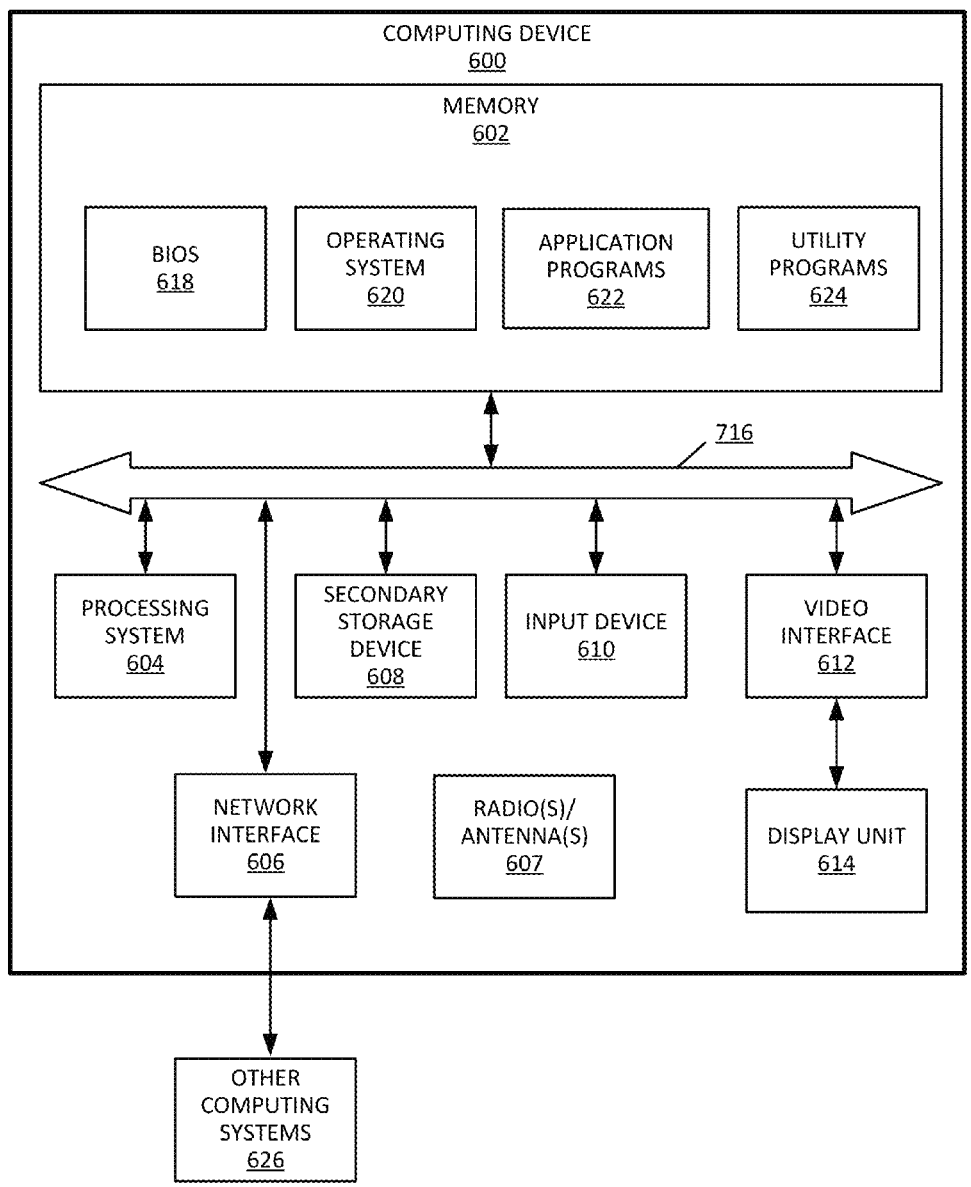
FIG. 6 is a block diagram illustrating example physical components of a computing device with which embodiments may be practiced.

FIG. 6 is a block diagram illustrating example physical components of a computing device 600 with which embodiments may be practiced. It should be appreciated that in other embodiments, different hardware components other than those illustrated in the example of FIG. 6 may be used. Computing devices may be implemented in different ways in different embodiments. For instance, in the example of FIG. 6, the computing device 600 includes a processing system 604, memory 602, a network interface 606 (wired and/or wireless), radio/antenna 607, a secondary storage device 608, an input device 610, a video interface 612, a display unit 614, and a communication medium 616. In other embodiments, the computing device 600 may be implemented using more or fewer hardware components (e.g., a video interface, a display unit, or an input device) or in combination with other types of computer systems and program modules 626.

The memory 602 includes one or more computer-readable storage media capable of storing data and/or computer-executable instructions. Memory 602 may store the computer-executable instructions that, when executed by processor 604, cause allocation and/or reallocation operations as part of load balancing internal connections. In various embodiments, the memory 602 is implemented in various ways. For example, the memory 602 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 604 includes one or more processing units, which may include tangible integrated circuits that selectively execute computer-executable instructions. In various embodiments, the processing units in the processing system 604 are implemented in various ways. For example, the processing units in the processing system 604 can be implemented as one or more processing cores. In this example, the processing system 604 can comprise one or more microprocessors. In another example, the processing system 604 can comprise one or more separate microprocessors. In yet another example embodiment, the processing system 604 can comprise Application-Specific Integrated Circuits (ASICs) that provide specific functionality. In yet another example, the processing system 604 provides specific functionality by using an ASIC and by executing computer-executable instructions.

The computing device 600 may be enabled to send data to and receive data from a communication network via a network interface card 606. In different embodiments, the network interface card 606 is implemented in different ways, such as an Ethernet interface, a token-ring network interface, a fiber optic network interface, a wireless network interface (e.g., WIFI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 608 includes one or more computer-readable storage media, and may store data and computer-executable instructions not directly accessible by the processing system 604. That is, the processing system 604 performs an I/O operation to retrieve data and/or computer-executable instructions from the secondary storage device 608. In various embodiments, the secondary storage device 608 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 610 enables the computing device 600 to receive input from a user. Example types of input devices include, but are not limited to, keyboards, mice, trackballs, stylus input devices, key pads, microphones, joysticks, touch-sensitive display screens, and other types of devices that provide user input to the computing device 600.

The video interface 612 outputs video information to the display unit 614. In different embodiments, the video interface 612 is implemented in different ways. For example, the video interface 612 is a video expansion card. In another example, the video interface 612 is integrated into a motherboard of the computing device 600. In various embodiments, the display unit 614 can be an LCD display panel, a touch-sensitive display panel, an LED screen, a projector, a cathode-ray tube display, or another type of display unit. In various embodiments, the video interface 612 communicates with the display unit 614 in various ways. For example, the video interface 612 can communicate with the display unit 614 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 616 facilitates communication among the hardware components of the computing device 600. In different embodiments, the communications medium 616 facilitates communication among different components of the computing device 600. For instance, in the example of FIG. 6, the communications medium 616 facilitates communication among the memory 602, the processing system 604, the network interface card 606, the secondary storage device 608, the input device 610, and the video interface 612. In different embodiments, the communications medium 616 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 602 stores various types of data and/or software instructions. For instance, in the example of FIG. 6, the memory 602 stores a Basic Input/Output System (BIOS) 618, and an operating system 620. The BIOS 618 includes a set of software instructions that, when executed by the processing system 604, cause the computing device 600 to boot up. The operating system 620 includes a set of software instructions that, when executed by the processing system 604, cause the computing device 600 to provide an operating system that coordinates the activities and sharing of resources of the computing device 600. The memory 602 also stores one or more application programs 622 that, when executed by the processing system 604, cause the computing device 600 to provide applications to users. The memory 602 also stores one or more utility programs 624 that, when executed by the processing system 604, cause the computing device 600 to provide utilities to other software programs.

Figures 7A, 7B:
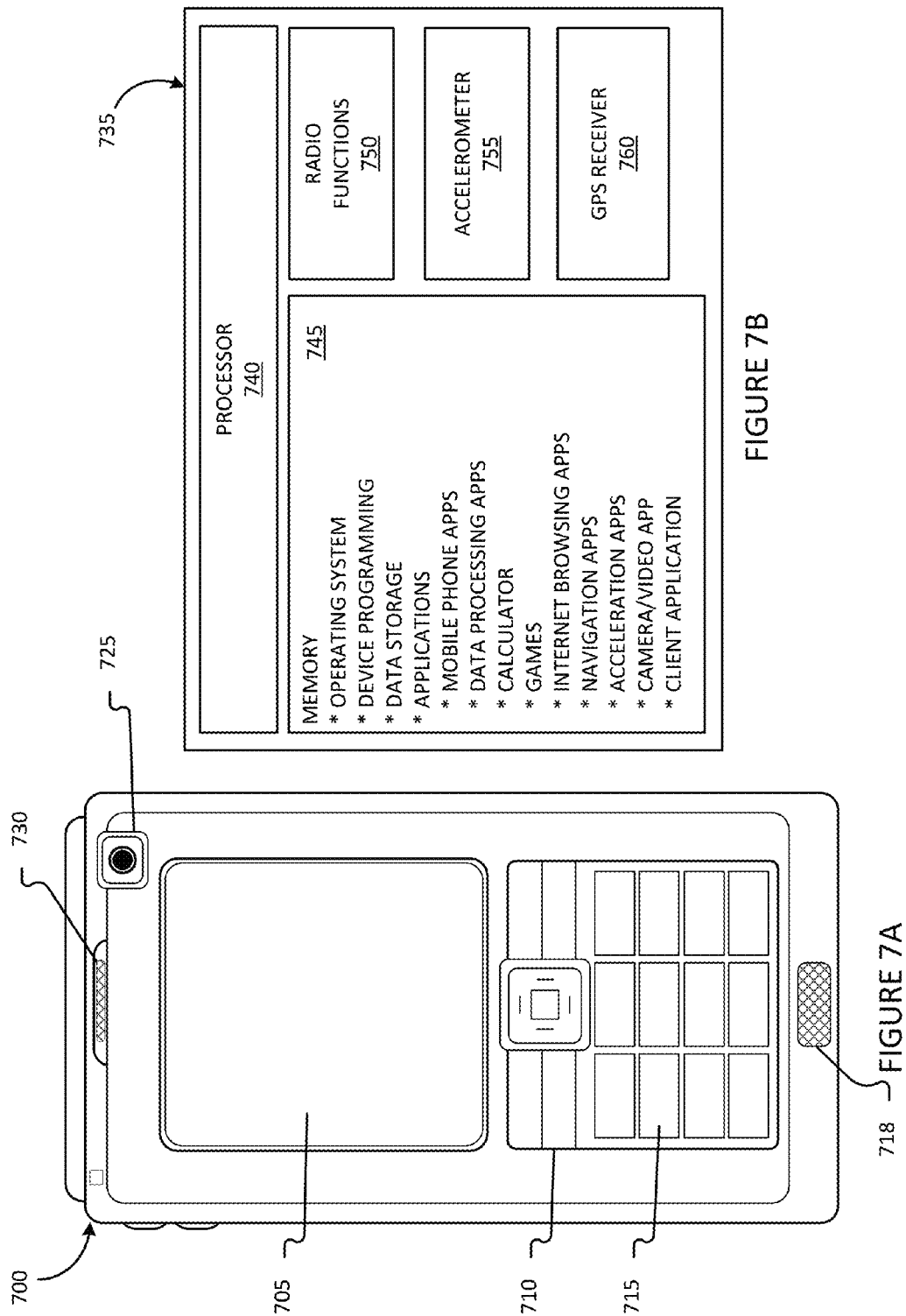
FIGS. 7A-7B illustrate a suitable mobile computing environment with which embodiments may be practiced.

FIGS. 7A-7B illustrate a suitable mobile computing environment, for example, a mobile computing device or smart phone, a tablet personal computer, a laptop computer, and the like, with which embodiments may be practiced. The mobile computing device 700 is illustrative of any suitable device operative to send, receive and process wireless communications. A display screen 705 is operative for displaying a variety of information such as information about incoming and outgoing communications, as well as, a variety of data and displayable objects, for example, text, alphanumeric data, photographs, and the like.

Data input to the device 700 may be performed via a variety of suitable means, such as, touch screen input via the display screen 705, keyboard or keypad input via a data entry area 710, key input via one or more selectable buttons or controls 715, voice input via a microphone 718 disposed on the device 700, photographic input via a camera 725 functionality associated with the device 700, or any other suitable input means. Data may be output via the device 700 via any suitable output means, including but not limited to, display on the display screen 705, audible output via an associated speaker 730 or connected earphone system, vibration module for providing tactile output, and the like.

Referring now to FIG. 7B, operational unit 735 is illustrative of internal operating functionality of the mobile computing device 700. A processor 740 is illustrative of a computer processor for processing incoming and outgoing data and communications and controlling operation of the device and associated software applications via a mobile computing device operating system. Memory 745 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, a wireless client may be stored locally on mobile computing device 700.

Mobile computing device 700 may contain an accelerometer 755 for detecting acceleration, and can be used to sense orientation, vibration, and/or shock. Mobile computing device 700 may contain a global positioning system (GPS) system (e.g., GPS send/receive functionality) 760. A GPS system 760 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 750 include all required functionality, including onboard antennae, for allowing the device 700 to communicate with other communication devices and systems via a wireless network. Radio functions 750 may be utilized to communicate with a wireless or WIFI-based positioning system to determine a device location.

Although described herein in combination with mobile computing device 700, in alternative embodiments aspects may be used in combination with any number of computer systems, such as in desktop environments, laptop or notebook computer systems, multiprocessor systems, microprocessor based or programmable consumer electronics, networked PCs, mini computers, main frame computers and the like. Embodiments may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

I claim:

1. A system comprising:
   a first vehicle that includes an interior portion and an exterior portion, the interior portion configured to hold a plurality of passengers, wherein the first vehicle provides a first network platform, the first vehicle including:
      a first access point (AP) comprising a cabin AP coupled to the interior portion for providing a number of internal connections to the plurality of passengers;
      a second AP coupled to a first location on the exterior portion for communicatively coupling to at least one service station AP positioned along a path of travel, wherein the second AP is communicatively coupled to the first AP;
      a third AP coupled to a second location on the exterior portion for communicatively coupling to the at least one service station AP positioned along the path of travel, wherein the third AP is communicatively coupled to the first AP and the second AP, wherein the cabin AP is positioned between the second AP and the third AP; and
   a controller that includes selection logic to allocate the number of internal connections between one or more of the second AP and the third AP, wherein the controller uses the selection logic to group the number of internal connections into a first group associated with a first user type, a second group associated with a second user type, and a third group associated with a third user type and allocates one or more of the number of internal connections associated with the first group to a best exterior AP that comprises one of the second AP or the third AP having a highest returned signal strength indicator (RSSI) or a highest signal to noise ratio (SNR).

2. The system of claim 1, wherein the controller monitors each of the second AP and the third AP to determine an amount of bandwidth available for the number of internal connections.

3. The system of claim 1, wherein the controller uses the selection logic to group the number of internal connections into allocation groups.

4. The system of claim 1, wherein the controller uses the selection logic to group the number of internal connections into a first group associated with a first device type, a second group associated with a second device type, and a third group associated with a third device type.

5. The system of claim 1, wherein the controller uses the selection logic to group the number of internal connections into a first group associated with a first application type, a second group associated with a second application type, and a third group associated with a third application type.

6. The system of claim 1, further comprising a second vehicle that provides a second network platform that includes a fourth AP coupled to an exterior portion of the second vehicle and a fifth AP coupled to the exterior portion of the second vehicle, wherein the controller moves a portion of the first group of users to one or more of the third AP, the fourth AP, or the fifth AP when an internal bandwidth associated with the number of internal connections is greater than or equal to an amount of available bandwidth of the second AP.

7. The system of claim 1, wherein the controller allocates one or more of the number of internal connections associated with a second group of users to a next best exterior AP that comprises the other one of the second AP or the third AP having a next highest RSSI or a next highest SNR.

8. The system of claim 7, wherein the controller allocates one or more of the number of internal connections associated with a third group of users to a worst exterior AP having a lowest RSSI or a lowest SNR.

9. The system of claim 1, further comprising one or more predefined lists of exterior access points or service station APs.

10. The system of claim 1, wherein the controller tracks bandwidth usage of the number of internal connections by media access control (MAC) address or Internet Protocol (IP) address.

11. The system of claim 1, further to use output of a camera system to identify one or more users associated with one or more of the first group, the second group, or the third group.

12. A method comprising:
   deploying a first vehicle that includes an interior portion and an exterior portion, the interior portion configured to hold a plurality of passengers, wherein the first vehicle provides a first network platform comprising:
      a first AP comprising a cabin AP coupled to the interior portion for providing a number of internal connections to the plurality of passengers;
      a second AP coupled to a first location on the exterior portion for communicatively coupling to at least one service station AP positioned along a path of travel, wherein the second AP is communicatively coupled to the first AP;
      a third AP coupled to a second location on the exterior portion for communicatively coupling to the at least one service station AP positioned along the path of travel, wherein the third AP is communicatively coupled to the first AP and the second AP, wherein the cabin AP is positioned between the second AP and the third AP; and using a controller that includes selection logic to allocate the number of internal connections between one or more of the second AP and the third AP, wherein the controller uses the selection logic to group the number of internal connections into a first group associated with a first user type, a second group associated with a second user type, and a third group associated with a third user type and allocates one or more of the number of internal connections associated with the first group to a best exterior AP that comprises one of the second AP or the third AP having a highest RSSI or a highest SNR.

13. The method of claim 12, wherein the controller uses the selection logic to group the number of internal connections into allocation groups.

14. The method of claim 12, wherein the controller uses the selection logic to group the number of internal connections into a first group associated with a first device type, a second group associated with a second device type, and a third group associated with a third device type.

15. The method of claim 12, wherein the controller uses the selection logic to group the number of internal connections into a first group associated with a first application type, a second group associated with a second application type, and a third group associated with a third application type.

16. The method of claim 12, further using output of a camera system to identify one or more users associated with one or more of the first group, the second group, or the third group.

17. The method of claim 12, further comprising tracking bandwidth usage of the number of internal connections by MAC address or IP address.

18. A non-transitory computer readable storage medium having instructions which, when executed, operate to:

use a first AP comprising a cabin AP coupled to an interior portion of a first vehicle for providing a number of internal connections to a plurality of passengers;

use a second AP coupled to a first location on an exterior portion of the first vehicle for communicatively coupling to at least one service station AP positioned along a path of travel, wherein the second AP is communicatively coupled to the first AP;

use a third AP coupled to a second location on the exterior portion of the first vehicle for communicatively coupling to the at least one service station AP positioned along the path of travel, wherein the third AP is communicatively coupled to the first AP and the second AP, wherein the cabin AP is positioned between the second AP and the third AP; and use a controller that includes selection logic to allocate the number of internal connections between one or more of the second AP and the third AP, wherein the controller uses the selection logic to group the number of internal connections into a first group associated with a first user type, a second group associated with a second user type, and a third group associated with a third user type and allocates one or more of the number of internal connections associated with the first group to a best exterior AP that comprises one of the second AP or the third AP having a highest RSSI or a highest SNR.

19. The non-transitory computer readable storage medium of claim 18, wherein the controller uses the selection logic to group the number of internal connections into a first group associated with a first device type, a second group associated with a second device type, and a third group associated with a third device type.

20. The non-transitory computer readable storage medium of claim 18, further to use output of a camera system to identify one or more users associated with one or more of the first group, the second group, or the third group.

* * * * *